Figure 1:
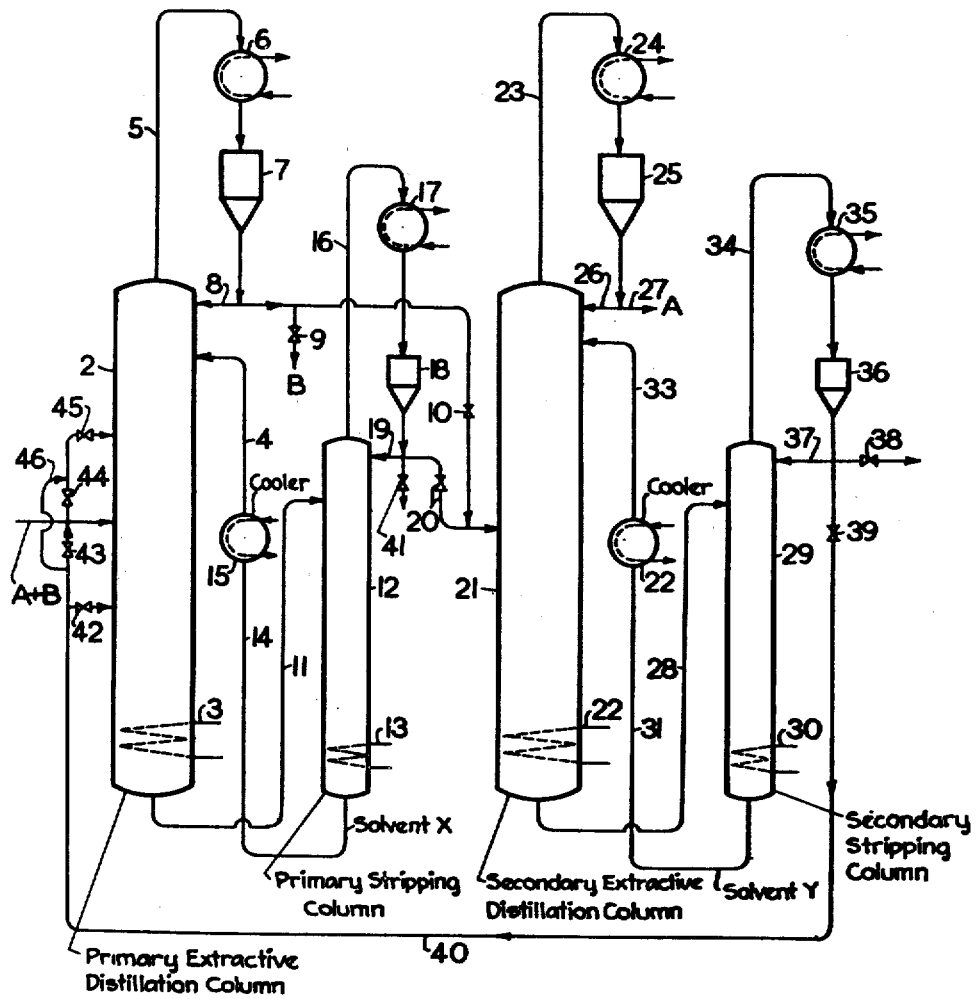
Figure 2:
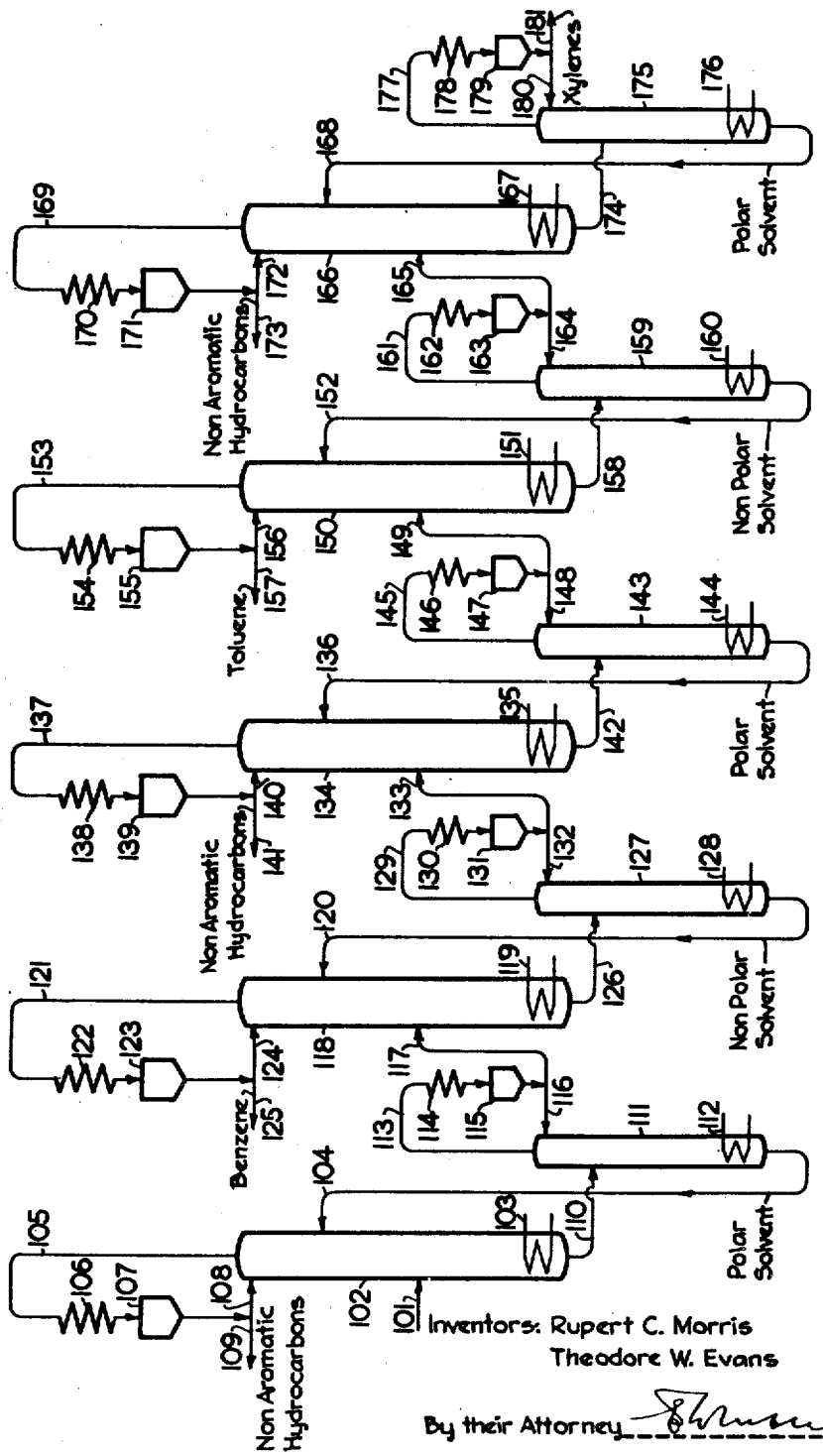

Jan. 13, 1948.  R. C. MORRIS ET AL  2,434,424
PLURAL STAGE EXTRACTIVE DISTILLATION WITH INVERSE SOLVENTS
Filed March 10, 1942  2 Sheets—Sheet 1

Inventors: Rupert C. Morris
Theodore W. Evans

By their Attorneys

Inventors: Rupert C. Morris
Theodore W. Evans
By their Attorney

Patented Jan. 13, 1948

2,434,424

UNITED STATES PATENT OFFICE 2,434,424

PLURAL STAGE EXTRACTIVE DISTILLATION WITH INVERSE SOLVENTS

Rupert C. Morris, Berkeley, and Theodore W. Evans, Oakland, Calif., assignors to Shell Development Company, San Francisco, Calif., a corporation of Delaware Application March 10, 1942, Serial No. 434,115

9 Claims. (Cl. 202—39.5)

The present invention relates to a process for separating distillable mixtures. More particularly, it relates to a process for separating mixtures having such similar vapor pressures, or possessing such a tendency to form azeotropes with one another, as to make their separation difficult or impossible by ordinary distillation. Still more particularly, it relates to a process for the separation of mixtures containing components which have different degrees of solubility in different solvents, e. g. hydrocarbon mixtures containing components of different degrees of saturation, etc.

It has long been recognized that it is impossible as a practical matter to separate by ordinary distillation certain mixtures containing components of very similar vapor pressures, or components which tend to form azeotropes with one another upon distillation. Examples of such mixtures are aromatic hydrocarbons such as benzene, toluene, the xylenes, etc., associated with paraffinic, naphthenic and olefinic hydrocarbons; synthetic mixtures of aromatics and non-aromatics, such as cyclohexane and benzene, alcohols and water, ethyl alcohol and water, ethyl alcohol and benzene. Many other mixtures of this type are known.

Several processes have been proposed to enable such mixtures to be separated; for example, it is sometimes possible to separate closely boiling mixtures by the addition of an azeotropic agent.

It has also been proposed to separate components of similar boiling temperatures but different solubilities with the aid of a relatively high boiling solvent by distilling the mxiture in the presence of the liquid solvent. Under these conditions the relative vapor pressure of the more soluble component is reduced by a greater amount than the vapor pressure of the less soluble component, and in this manner it is sometimes possible to take overhead the less soluble component and subsequently separate the more soluble component from the relatively high boiling solvent in a separate distilling operation. This type of distillation has been termed extractive distillation, and it is wtih an improved method of extractive distillation that the present invention is particularly concerned.

Unfortunately, by extractive distillation it has not always been possible to effect satisfactory separations owing to slight differences in solubilities or because of the boiling ranges of the mixtures being too wide, etc. In such instances, in order to produce pure products by employing extractive distillation it is sometimes necessary to very carefully prefractionate the feed to be extractively distilled; for example, it has heretofore been impossible to prepare nitration grade toluene from petroleum fractions by extractive distillation unless the feed to the extractive distillation system was very carefully prefractionated to exclude materials boiling more than about 10° C. above the boiling point of the toluene.

It is an object of the present invention to provide a process capable of producing pure components from mixtures which are normally difficult to separate for the reasons given above. It is a further object to provide an improved process which permits pure components to be produced from hydrocarbon fractions not requiring careful prefractionation. A further object is the production of a series of pure components from a relatively wide boiling range fraction containing a plurality of components of various types. Still further objects of our invention will be apparent from the following.

The present invention comprises distilling a mixture containing components having different solubilities in a first solvent under conditions to produce an overhead fraction comprising predominantly the least soluble component and a residual fraction comprising the more soluble component, and subsequently distilling one or both of the fractions so produced in the presence of a different solvent which bears an inverse solubility relationship to the components as compared to the first solvent.

The invention may be more fully understood by consideration of the attached drawings, Figure I and Figure II being flow diagrams each representing different embodiments of the invention. Thus, Figure I is a flow diagram wherein a mixture comprising two components A and B (each of which components may comprise other components) are separated.

A feed mixture, which may be liquid or vaporous or both, comprising components A and B which normally are difficult to separate by ordinary distillation owing to similar vapor pressures, is fed through line 1 to primary extractive distillation column 2 provided with reboiler 3. The liquid in the bottom of the column is caused to boil by heat supplied by reboiler 3 so that vapors pass up through the column, which latter may be a packed, spray or bubble tray type, and thus flow countercurrently to a first relatively high boiling solvent X which is admitted to column 2 via line 4. Solvent X is of such nature that component A is more soluble therein than component B, and therefore the relative vapor pressure of A is decreased with respect to that of B.

Owing to difficulties inherent in such operations it is normally impracticable to cut sharply between component A on the one hand and component B on the other. Thus, it is ordinarily impossible to take overhead pure B without leaving a small residual quantity of B in the solvent along with A; or conversely, if the solvent is to contain pure A and be substantially free from B, it is practically impossible to prevent a small quantity of A from passing overhead with B. If it is desired to produce both A and B in pure form, additional steps must be taken, and these subsequent steps depend upon whether in column 2 B is being taken overhead substantially free from A, or a solution of pure A substantially free from B in the solvent is withdrawn from the bottom of the column 2.

In the first case, vapors of pure B substantially free from solvent and A pass overhead through line 5 to condenser 6. Liquefied component B collects in accumulator 7 whence a portion is returned to column 2 via line 8 as reflux, while the remaining portion is withdrawn via valved line 9 (valve 10 being closed) as final product. Fat solvent X containing dissolved A and a minor portion of B is withdrawn from column 2 via line 11, passing to primary stripping column 12 provided with reboiler 13. Herein solvent X is separated from components A and B and returned back to column 2 via line 14, cooler 15 and line 4 for use in another cycle.

Vapors of A and B pass overhead through line 16 to condenser 17. Condensate collects in accumulator 18 whence a portion is returned to column 12 as reflux via line 19. The remaining portion of A+B passes via valved line 20 to secondary extractive distillation column 21 provided with reboiler 22.

Herein the feed is distilled in the presence of a second solvent Y admitted via line 33. Solvent Y bears the inverse solubility relationship with respect to components A and B to solvent X; that is, Y has greater solvent power for B than for A. Under these circumstances, by careful control of heat input, reflux ratio and solvent feed rate, A substantially free of B is taken overhead through line 23 to condenser 24. Condensed vapors collect in accumulator 25, whence a portion is returned to column 21 as reflux via line 26, while the remaining portion may be withdrawn through line 27 as final product. Solvent Y containing dissolved B and a minor portion of A is withdrawn from the bottom of column 21 through line 28, passing to secondary stripping column 29 provided with reboiler 30. Herein solvent Y is separated from residual A and B, the former returning to column 21 via line 31, cooler 22 and line 33, for use in another cycle. Residual quantities of A and B pass overhead through line 34 to condenser 35. Condensed vapors collect in accumulator 36 whence a portion may be returned to column 29 via line 37 as reflux. The remaining portion of residual A+B may be discarded via valved line 38 (valve 39 being closed) or else may be returned to a level in column 2 where the vapor composition is the same or near to the composition of the recycled material via line 40 and the manifold system comprising valves 42, 43, 44, 45 and bypass line 46, to recover residual quantities of A+B (valve 38 being closed).

In the second variation, vapors of B containing a minor portion of A pass overhead through line 5 to condenser 6. Liquefied components A and B collect in accumulator 7 whence a portion is returned to column 2 via line 8 as reflux, while the remaining portion passes via valved line 10 (valve 9 being closed) and line 20 to column 21.

From the bottom of column 2 solvent containing substantially pure A is withdrawn via line 11, passing to column 12. Herein the solvent is separated from dissolved component A, the former being returned to column 2 via line 14, cooler 15 and line 4, for use in another cycle. Overhead vapors consisting of substantially pure A pass via line 16 to condenser 17. Condensed A collects in accumulator 18, whence a portion is returned as reflux to column 12 via line 19, while the remainder is withdrawn as final product via valved line 41 (valve 20 being closed).

The mixture A+B from line 10 being fed to column 21 is treated similarly to A+B described above, except that, if it is desired to produce both components A and B in pure form, column 21 should be operated under conditions to take a portion of B overhead with the A in order to remove solvent and B from the bottom of column 21 free from A. Pure B is then withdrawn from the system via line 38 (valve 39 being closed). Under these circumstances the produce withdrawn from line 27 is a mixture of A+B and may be discarded or recycled to the feed for further treatment in a manner similar to that of the product described above withdrawn through valved line 39.

If it is desired to produce only A in pure form, then column 21 may be operated to take overhead A substantially free from B, and pure product A is withdrawn via line 27 as well as from valved line 40, while a mixture of A+B is withdrawn via line 38. In such a case the relative proportions of A+B are different, which may require different solvent-to-feed rates from those required in the first operation. It will be understood that in certain cases it may be desirable to first employ solvent Y in column 2 followed by treatment with solvent X in column 21. The exact manner in which the separation is carried out will depend upon the particular separation under consideration, the relative proportions of components in the feed to the various columns, and the desired degree of separation to be obtained.

Figure II illustrates another embodiment of the present invention wherein a series of pure aromatic hydrocarbon fractions are produced from a mixture containing other hydrocarbons which tend to form azeotropes with aromatic hydrocarbons.

A feed, such as a straight-run gasoline fraction boiling between 63° C. and 147° C., containing small percentages of benzene, toluene, ortho-, meta- and para-xylenes and ethyl benzene, and paraffinic and naphthenic hydrocarbons naturally associated therewith (hereinafter designated as non-aromatic hydrocarbons) is fed continuously via line 101 to fractionating column 102 equipped with reboiler 103. Herein the feed is contacted with a relatively high-boiling polar selective solvent for aromatic hydrocarbons such as a narrow-boiling alkyl phenol mixture, for example one boiling between 210° C. and 220° C. (hereinafter referred to as polar solvent), which is admitted through line 104 and passes down the column as the distillation proceeds. The presence of the solvent reduces the relative vapor pressure of the aromatic hydrocarbons more than that of the non-aromatic hydrocarbons, and by controlling the reflux ratio and solvent ratio, column 102 is so regulated that almost all of the non-aromatic hydrocarbons which do pass overhead through line 105, normally in the absence of selective solvent would form azeotropes with benzene; while the benzene and higher boiling aromatics together with the relatively high boiling non-aromatic hydrocarbons pass from the bottom of column 102. The overhead vapors are condensed in condenser 106 and collected in accumulator 107. A portion of this condensate is returned to column 102 as reflux through line 108, the remainder passing to storage not shown through line 109.

From the bottom of column 102 the residue, including benzene and only minor quantities of non-aromatics which normally tend to form azeotropes with benzene, pass through line 110 to fractionating column 111 equipped with reboiler 112. Herein the hydrocarbons are separated from the polar solvent, which is withdrawn from the bottom of column 111 through line 104 substantially free from hydrocarbons, and is recycled to column 102. If desired, the recovered solvent may be first cooled before returning to column 102 in coolers (not shown) or be admitted hot. The overhead hydrocarbon vapors pass through line 113 to condenser 114. Condensed vapors collect in accumulator 115, whence a portion of the condensate is returned to column 111 as reflux via line 116, while the remainder passes via line 117 to fractionating column 118 equipped with reboiler 119.

In column 118 the hydrocarbon mixture is contacted with a relatively high boiling non-polar solvent, such as paraffin wax, admitted via line 120. The paraffin wax, although not so selective for non-aromatic hydrocarbons as polar solvents are, in general, for aromatic hydrocarbons, nonetheless suffice to reduce the relative vapor pressure of the small residual quantities of non-aromatic hydrocarbons that would otherwise form azeotropes with benzene to a degree which, in conjunction with careful control of reflux and solvent ratios to column 118, allows pure benzene vapors to be taken overhead through line 121 to condenser 122. Liquid benzene collects in accumulator 123, whence a portion is returned to column 118 as reflux through line 124, while the remainder passes to storage not shown as a pure benzene product through line 125.

Residual gasoline hydrocarbons dissolved in the non-polar solvent pass through line 126 to fractionating column 127 equipped with reboiler 128. Therein the mixture is fractionally distilled into solvent substantially free from gasoline hydrocarbons, which solvent is recirculated to column 118 through line 120, and an overhead vapor comprising the gasoline hydrocarbons, which passes overhead through line 129 to condenser 130. Condensate collects in accumulator 131, a portion of which is returned to column 127 via line 132 as reflux, while the remainder passes through line 133 to column 134 equipped with reboiler 135. In column 134 the feed is contacted with another portion of polar solvent, which is admitted through line 136 and serves to reduce the relative vapor pressure of the aromatic hydrocarbons including toluene so that by careful control of the reflux and solvent ratios, etc., it is possible to take overhead as vapors most of the non-aromatic hydrocarbons which normally, in the absence of solvent, would pass overhead with the toluene as azeotropes, as well as the small amounts of the non-aromatic hydrocarbons which would have formed azeotropes with the benzene in the absence of the non-polar solvent in column 102 but which instead were carried away as bottom product from column 102 together with the polar solvent through line 110. These vapors pass overhead through line 137 to condenser 138. Condensate collects in accumulator 139, whence a portion passes back to column 134 as reflux via line 140 while the remainder passes to storage not shown, through line 141.

The residual hydrocarbons from column 134, including toluene and only very minor quantities of hydrocarbons which normally tend to form azeotropes with toluene, together with heavier hydrocarbons and polar solvent, pass through line 142 to column 143 equipped with reboiler 144. Herein the solution is fractionally distilled, solvent being recycled to column 134 through line 136, while the vaporized hydrocarbons pass overhead through line 145 to condenser 146. Condensed hydrocarbons collect in accumulator 147. A portion of the condensate is returned to column 143 as reflux via line 148 while the remaining portion passes via line 149 to column 150 equipped with reboiler 151.

Herein the hydrocarbon feed is contacted with non-polar solvent admitted through lines 152. The latter lowers the relative vapor pressure of small residual quantities of non-aromatic hydrocarbons which, in the absence of solvent, would pass overhead as azeotrope with toluene, thus permitting vapors of nitration grade toluene to pass overhead through line 153 to condenser 154. Condensed toluene collects in accumulator 155. A portion of the toluene is returned to column 150 as reflux via line 156 while the remainder passes via line 157 to storage (not shown).

The residual hydrocarbons now free from toluene but still containing xylenes and ethyl benzene, non-aromatic hydrocarbons normally associated therewith, as well as the small residual quantities of non-aromatics which would normally pass overhead with toluene, pass via line 158 to column 159 equipped with reboiler 160, wherein they are separated from non-polar solvent by fractional distillation, solvent recirculating back to column 150 via line 152. The mixed hydrocarbon vapors pass overhead via line 161 to condenser 162. Condensate collects in accumulator 163 whence a portion returns via line 164 as reflux while the remainder passes via line 165 to column 166 equipped with reboiler 167.

The feed to column 166, which by now is only a small portion of the original fraction distilled, is again contacted with polar solvent admitted via line 168, which reduces the relative vapor pressure of remaining aromatic hydrocarbons, that is the xylenes and ethyl benzene, permitting practically all of the non-aromatic hydrocarbons which would normally form azeotropes with the xylenes and ethyl benzene to pass overhead along with small residual quantities of non-aromatic hydrocarbons that were prevented from passing overhead as azeotrope with the toluene in column 150. The mixed hydrocarbon vapors pass through line 169 to condenser 170. Condensate collects in accumulator 171, whence a portion is returned via line 172 to column 166 as reflux while the remainder passes to storage (not shown) through line 173.

From the bottom of column 166 a mixture comprising predominantly xylenes, ethyl benzene and polar solvent is withdrawn through line 174 and passes to column 175 equipped with reboiler 176. Herein the polar solvent is separated from the xylenes and ethyl benzene, recirculating back to column 166 through line 168 for use in another cycle, while the vapors pass overhead via line 177 to condenser 178. Condensate collects in accumulator 179, whence a portion returns to column 175 as reflux via line 180, while the remainder passes via line 181 to storage not shown.

Although the xylenes so produced contain small residual portions of non-aromatic hydrocarbons, they may often be employed for commercial purposes in this state. However, if desired, they can be further freed from non-aromatic hydrocarbons by subjecting the product from line 181 to further stages of treatment, as described before, with alternate solvents.

Although in the foregoing description the same non-polar and polar solvents have been indicated in each corresponding stage, this is not necessary because, if desired, different polar solvents may be employed in the "polar" stages and, likewise, different non-polar solvents may be employed in the various "non-polar" stages without departing from the spirit of the present invention.

In the treatment of hydrocarbon mixtures, for example petroleum distillates, it is generally preferable to employ the polar solvent first, followed by treatment with the non-polar solvent. In this manner the normal tendency for any light hydrocarbon ends to come overhead in enhanced, resulting in initially reducing the amount of material to be treated with non-polar solvent in subsequent operations.

In this connection it may be pointed out that the present invention takes advantage, in the case of separations of hydrocarbons having different degrees of saturation, of the initial reduction of the quantity of more saturated hydrocarbons. By following this preferred sequence the residual hydrocarbon mixture separated from the first treatment with polar solvent contains only relatively small amounts of saturated hydrocarbons which tend to form azeotropes with the less saturated hydrocarbons, because polar solvents are available which have very high selectivity for the more unsaturated compounds. As a result, the remaining saturated hydrocarbons can be effectively prevented from going overhead in the subsequent distillation in the presence of non-polar solvent, even though in general the selectivity of the known non-polar solvents for more saturated hydrocarbons is relatively poor.

For simplicity, bypasses, pumps, heat exchangers, valves, control means and other auxiliaries, the proper placement of which is evident to one skilled in the art, have been omitted.

As can be seen from the foregoing, the present invention has wide applicability, being applicable to any ordinarily difficult separation, depending upon differences in vapor pressure, for which there exists a pair of "inverse" solvents. In other words, the present process is applicable to the separation of any two components A and B (which themselves may be multi-component mixtures) having such similar vapor pressures as to make their separation by ordinary distillation difficult, provided a pair of relatively high boiling solvents X and Y exist bearing the following relationship:

$$\frac{\text{Solubility of A in X}}{\text{Solubility of B in X}} > 1$$

$$\frac{\text{Solubility of A in Y}}{\text{Solubility of B in Y}} < 1$$

Of course, the greater the solubility difference of the components A and B respectively in solvents X and Y, the more complete the separation that can be attained.

Examples of processes to which the present invention is particularly applicable are those in which so-called polar and non-polar solvents are employed alternately for the separation of fatty oils, fatty acids, amines, alcohols, nitrogen bases, essential oils, mixed chlorinated hydrocarbons, phenol and thiophenol mixtures, naval store products, and hydrocarbon mixtures, particularly those containing hydrocarbons of different degrees of saturation. For example, aromatic hydrocarbons of high purity can be separated from non-aromatic hydrocarbons of different degrees of saturation which occur in fractions derived from petroleum through distillation, cracking, dehydrogenation, hydrogenation, isomerization, cyclization, hydroforming, etc. A single aromatic hydrocarbon such as toluene of nitration grade may be prepared by employing alternately a polar solvent such as phenol, and a non-polar solvent such as paraffin wax, or a paraffinic mineral oil having a "characterization factor" as defined by Watson et al., Ind. Eng. Chem., vol. 27 (1935), pp. 1460–1464, of at least 12.0, and having a boiling range sufficiently high to remain at least partially liquid during the extractive distillation.

Suitable non-polar solvents may be prepared from several sources, for example petroleum, synthetic hydrocarbon fractions which themselves may be derived from petroleum, or other hydrocarbon fractions, for example those prepared by the hydrogenation of coal or the Fischer-Tropsch synthesis ($CO+H_2+$catalyst), etc. Suitable starting materials are subjected to distillation, solvent extraction, extractive distillation, or chemical treatment, for example with strong sulfuric acid, or by a combination of these treatments to remove aromatic type hydrocarbons and produce a solvent of appropriate boiling range.

Examples of polar solvents which are useful for separations of this type are: phenol, cresylic acids, alkyl phenol mixtures, aniline, alkyl anilines, diphenylamines, ditolylamines; carbitols (diethylene glycol mono ethers) such as methyl, ethyl, propyl carbitols; chlorinated dialkyl ethers such as beta-beta-dichlorethyl ether; nitrobenzene, nitrotoluene, nitroxylenes; naphthols, alkyl naphthols, benzophenone, phenyl tolyl ketone, diphenylene ketone; alkyl phthalates, such as dimethyl phthalate; alkyl salicylates, such as methyl salicylate; benzyl alcohol, benz chlorides, i. e. benzyl, benzal, benzo chlorides; benzonitrile, diphenyl oxide, ditolyl oxide, hydroxy pyridine, nitropyridine, chlorinated pyridines, quinoline, isoquinoline, chlorinated quinoline, hydroxy quinolines, 5-nitro quinoline, tetra hydro furfuryl alcohol, furfuryl alcohol, furfural, the mono glycerol ethers such as 1-methoxy glycerol, 2-methoxy glycerol, 1-ethoxy glycerol, 2-ethoxy glycerol, 1-propoxy glycerol, 2-propoxy glycerol, 1-isopropoxy glycerol, 2-isopropoxy glycerol; the glycerol di-ethers, such as 1,2-dimethoxy glycerol, 1,3-dimethoxy glycerol, 1,2-diethoxy glycerol, 1,3-diethoxy glycerol, 1,2-dipropoxy glycerol, 1,3-dipropoxy glycerol, 1,2-di-isopropoxy glycerol, and 1,3-di-isopropoxy glycerol; the mixed diglycerol ether esters, such as 1-ethoxy, 2-methoxy glycerol, 1-methoxy, 3-propoxy glycerol, 1-ethoxy, 2-isopropoxy glycerol; antimony trichloride; various sulfones, etc.

Our process is further applicable to the separation of isomeric substances with appropriate higher boiling polar and non-polar solvents such as are disclosed in U. S. Patent 2,245,945.

Likewise, the invention is applicable when it is desired to separate a series of hydrocarbons of different degrees of saturation from a relatively wide boiling hydrocarbon fraction from petroleum and coal tar sources.

Butadiene in a highly pure form may be separated from mixed C₄ petroleum fractions by first distilling in the presence of a polar solvent to take a mixture of butadiene and beta-butylene off the bottom with the solvent, which mixture is separated from the solvent and subsequently distilled in the presence of a non-polar solvent such as a relatively narrow boiling paraffinic kerosene fraction to take the butadiene overhead in a substantially pure condition and recover the beta-butylene as a bottom product.

Sometimes, however, when the relatively non-polar component of greater natural volatility than that of the relatively more polar component is present in small quantities only, it is desirable to employ non-polar solvent first, followed by fractionation in the presence of a polar solvent. Such is the situation when separating a C₄ fraction containing a major portion of beta-butylene and butadiene and a minor portion only of alpha-butylene.

The foregoing examples included for purposes of illustration only will suggest many other applications to other distillation problems of the principle of inverse solvents as set forth in the present specification.

In the specification and claims, by "ordinary distillation" is meant any distillation in the absence of added selective solvents or azeotrope-forming agents.

It will be further understood that components designated by the letters A, B, C, etc., may themselves be multi-component mixtures or pure chemical compounds, e. g. the letter A may represent a mixture of saturated hydrocarbons of close boiling range which are normally associated with and boil close to a single aromatic hydrocarbon such as toluene, which may itself be represented by the letter A.

We claim as our invention:

1. A process for separating butadiene from a C₄ hydrocarbon mixture comprising butadiene, beta butylene and more saturated C₄ hydrocarbons, comprising the steps of extractively distilling said mixture in the presence of a first relatively high boiling polar solvent under conditions to produce a first overhead fraction comprising said more saturated hydrocarbons and a residual fraction comprising butadiene, beta butylene and said solvent, separating said solvent from said residual fraction, and extractively distilling at least a part of said residual fraction in the presence of a relatively high boiling non-polar solvent for beta butylene under conditions to take butadiene overhead.

2. In a process for separating a mixture comprising a pair of relatively low boiling vaporizable components A and B and a pair of relatively high boiling vaporizable components C and D, the members of each of said pairs of components being not readily separable from each other by ordinary distillation, A being more soluble than B in a relatively high boiling solvent W, B being more soluble than A in a relatively high boiling solvent X, and C being more soluble than D in a relatively high boiling solvent Y, the steps of distilling said mixture in the presence of said solvent W under conditions to take overhead B and leave a residue comprising components A, C and D dissolved in solvent W, separating W from said residual components, distilling said residual components in the presence of solvent X under conditions to take overhead A and leave a second residue comprising components C and D dissolved in solvent X, separating said second residual components from solvent X, and distilling them in the presence of solvent Y under conditions to take overhead D and leave a third residue comprising C dissolved in solvent Y.

3. The process of claim 2 wherein said solvents W and Y are polar solvents, and solvent X is a non-polar solvent.

4. The process of claim 2 wherein W and Y are the same polar solvent.

5. In a process for separating a vaporizable hydrocarbon mixture comprising at least two aromatic hydrocarbons differing from each other in carbon content by not more than one carbon atom, together with more saturated hydrocarbons having vapor pressures in the presence of said aromatic hydrocarbons so similar to the vapor pressures of said aromatic hydrocarbons as to prevent said saturated hydrocarbons from being readily separated from said aromatic hydrocarbons by ordinary distillation, the steps of distilling said mixture in the presence of a relatively high boiling polar solvent under conditions to take overhead a first portion of said more saturated hydrocarbons normally having vapor pressures similar to the vapor pressure of the lower boiling of said aromatic hydrocarbons and leave a residue comprising said aromatic hydrocarbons and a second portion of said more saturated hydrocarbons, having vapor pressure similar to the vapor pressure of the higher boiling aromatic hydrocarbon, dissolved in said relatively high boiling polar solvent, separating said polar solvent from said residual components, distilling said residual components in the presence of a relatively high boiling non-polar solvent under conditions to take overhead said lower boiling aromatic hydrocarbon and leave a second residue comprising the relatively high boiling aromatic hydrocarbon and at least a part of said second portion of said more saturated hydrocarbons dissolved in said non-polar solvent, separating said dissolved hydrocarbons from said non-polar solvent and distilling them in the presence of a relatively high boiling polar solvent under conditions to take overhead at least a part of said second portion of said more saturated hydrocarbons and to leave a third residue comprising said relatively high boiling aromatic hydrocarbon dissolved in said polar solvent.

6. In a process for separating a hydrocarbon mixture comprising benzene and toluene and more saturated hydrocarbons having in the presence of benzene and toluene vapor pressures so similar to the vapor pressures of benzene and toluene as to prevent said saturated hydrocarbons from being readily separated from said aromatic hydrocarbons by ordinary distillation, the steps of distilling said hydrocarbon mixture in the presence of a relatively high boiling polar solvent under conditions to take overhead a first portion of said more saturated hydrocarbons having vapor pressures similar to benzene and leave a residue comprising benzene, toluene and a second portion of said more saturated hydrocarbons, having vapor pressures similar to toluene, dissolved in said solvent, separating said solvent from said residual hydrocarbons, distilling said residual hydrocarbons in the presence of a relatively high boiling non-polar solvent under conditions to take overhead benzene and leave a second residue comprising toluene and at least a part of said second portion of said more saturated hydrocarbons dissolved in said non-polar solvent, separating said second residual hydrocarbons from said non-polar solvent, distilling said second residual hydrocarbons in the presence of a relatively high boiling polar solvent under conditions to take overhead at least a part of said second portion of more saturated hydrocarbons and leave a third residue comprising toluene dissolved in said polar solvent.

7. In a process for separating a vaporizable hydrocarbon mixture comprising at least two aromatic hydrocarbons differing from each other in carbon content by not more than one carbon atom, together with more saturated hydrocarbons having vapor pressures in the presence of said aromatic hydrocarbons so similar to the vapor pressures of said aromatic hydrocarbons as to prevent said saturated hydrocarbons from being readily separated from said aromatic hydrocarbons by ordinary distillation, the steps of distilling said mixture in the presence of a relatively high boiling non-polar solvent under conditions to take overhead the lower boiling of said aromatic hydrocarbons and leave a residue comprising the higher boiling aromatic hydrocarbon and said more saturated hydrocarbons dissolved in said relatively high boiling non-polar solvent, separating said non-polar solvent from said residual components, distilling said residual components in the presence of a relatively high boiling polar solvent under conditions to take overhead a first portion of said more saturated hydrocarbons having vapor pressures similar to the vapor pressure of the lower boiling aromatic hydrocarbon and leave a second residue comprising the relatively high boiling aromatic hydrocarbon and a second portion of the more saturated hydrocarbons, normally having vapor pressures similar to the vapor pressure of said higher boiling aromatic hydrocarbon, dissolved in said polar solvent, separating said dissolved hydrocarbons from said polar solvent and distilling them in the presence of a relatively high boiling non-polar solvent under conditions to take overhead said relatively high boiling aromatic hydrocarbon and leave a third residue comprising at least a part of said second portion of said more saturated hydrocarbons dissolved in said non-polar solvent.

8. In a process for separating a vaporizable hydrocarbon mixture comprising toluene and $C_8$ aromatic hydrocarbons and more saturated hydrocarbons having in the presence of said aromatic hydrocarbons vapor pressures so similar to the vapor pressures of said aromatic hydrocarbons as to prevent said saturated hydrocarbons from being readily separated from said aromatic hydrocarbons by ordinary distillation, the steps of distilling said hydrocarbon mixture in the presence of a relatively high boiling polar solvent under conditions to take overhead a first portion of said more saturated hydrocarbons having vapor pressures similar to toluene and leave a residue comprising $C_8$ aromatic hydrocarbons and a second portion of said more saturated hydrocarbons, having vapor pressures similar to said $C_8$ aromatic hydrocarbons, dissolved in said solvent, separating said solvent from said residual hydrocarbons, distilling said residual hydrocarbons in the presence of a relatively high boiling non-polar solvent under conditions to take overhead toluene and leave a second residue comprising said $C_8$ aromatic hydrocarbons and at least a part of said second portion of said more saturated hydrocarbons dissolved in said non-polar solvent, distilling said second residual hydrocarbons in the presence of a relatively high boiling polar solvent under conditions to take overhead at least a part of said second portion of more saturated hydrocarbons and to leave a residue comprising said $C_8$ aromatic hydrocarbons dissolved in said polar solvent.

9. A process for separating a $C_4$ hydrocarbon mixture comprising a major portion of butadiene and beta-butylene and a minor portion of alpha-butylene, comprising the steps of extractively distilling said mixture in the presence of a first relatively high boiling non-polar solvent under conditions to produce a first overhead fraction rich in butadiene and alpha-butylene and a residual fraction rich in beta-butylene and said solvent, further extractively distilling at least a part of said overhead fraction in the presence of a polar solvent under conditions to take overhead alpha-butylene and leave a residual fraction comprising said polar solvent and being rich in butadiene.

RUPERT C. MORRIS.
THEODORE W. EVANS.

REFERENCES CITED

The following references are of record in the file of this patent:

UNITED STATES PATENTS

| Number | Name | Date |
|---|---|---|
| 1,882,978 | Schmidt et al. | Oct. 18, 1932 |
| 1,884,241 | Ricard | Oct. 25, 1932 |
| 1,912,349 | Tuttle | May 30, 1933 |
| 1,948,777 | Young et al. | Feb. 27, 1934 |
| 2,109,157 | Tijmstra | Feb. 22, 1938 |
| 2,113,965 | Roelfsema | Apr. 12, 1938 |
| 2,123,642 | Wiezevich | July 12, 1938 |
| 2,220,016 | Lyons | Oct. 29, 1940 |
| 2,246,982 | Nederbragt | June 24, 1941 |